United States Patent
Yui et al.

(10) Patent No.: US 6,875,798 B2
(45) Date of Patent: Apr. 5, 2005

(54) WATER BASED INK CAPABLE OF DECOLORIZING OR DISCOLORING AND A PROCESS FOR THE PRODUCTION OF THE SAME

(75) Inventors: Satoru Yui, Tokyo (JP); Naoki Sakurai, Tokyo (JP); Koichi Ito, Tokyo (JP)

(73) Assignee: Zebra Co., Ltd., Tokyo (JP)

( * ) Notice: Subject to any disclaimer, the term of this patent is extended or adjusted under 35 U.S.C. 154(b) by 209 days.

(21) Appl. No.: 09/983,255

(22) Filed: Oct. 23, 2001

(65) Prior Publication Data

US 2002/0143080 A1 Oct. 3, 2002

(30) Foreign Application Priority Data

Jan. 26, 2001 (JP) .......................................... 2001-018118
Sep. 26, 2001 (JP) .......................................... 2001-293691

(51) Int. Cl.$^7$ .......................... C09D 11/10; C08L 25/04; C08L 23/00; C08L 33/02; C08L 33/08; C08L 33/10; C08L 33/18
(52) U.S. Cl. ........................ 523/160; 524/556; 524/570; 524/577
(58) Field of Search ................................. 523/160, 161; 524/556, 560, 577, 570; 106/31.6, 31.18, 31.19, 31.2, 31.16

(56) References Cited

U.S. PATENT DOCUMENTS

| | | | |
|---|---|---|---|
| 4,421,560 A | | 12/1983 | Kito et al. |
| 4,838,940 A | * | 6/1989 | Kan et al. ................. 106/31.13 |
| 5,294,664 A | * | 3/1994 | Morrison et al. ............ 524/560 |
| 5,888,283 A | * | 3/1999 | Mehta et al. ............. 106/31.16 |

FOREIGN PATENT DOCUMENTS

| | | | |
|---|---|---|---|
| EP | 0 980 028 A1 | 2/2000 | |
| EP | 1 041 447 A1 | 10/2000 | |
| JP | 54-22344 | 6/1979 | ........... C09D/11/16 |
| JP | 2-29102 | 6/1990 | ........... C09D/11/00 |
| JP | 6-73319 | 3/1994 | ........... C09D/11/00 |
| JP | 7-81236 | 3/1995 | ............ B41M/5/26 |
| JP | 9-302295 | 11/1997 | ........... C09D/11/16 |
| JP | 10-88046 | 4/1998 | ........... C08D/11/00 |
| JP | 10-287081 | 10/1998 | ............ B43K/7/00 |
| JP | 2000-506190 | 5/2000 | ............ C09D/9/00 |
| JP | 2000-249544 | 8/2000 | ............ B43K/7/00 |
| JP | 2001-220530 A | * 8/2001 | |
| JP | 2001-271011 A | * 10/2001 | |

OTHER PUBLICATIONS

Machine Translation of JP 2001–271011 (2001).*
Machine Translation of JP 2001–220530 (2001).*

* cited by examiner

Primary Examiner—Callie Shosho
(74) Attorney, Agent, or Firm—Sughrue Mion, PLLC

(57) ABSTRACT

There is provided a water based ink capable of decolorizing or discoloring written or printed letters or images through an organic solvent or heating, which is used for a writing instrument such as roller balls, makers, etc., printing inks, ink jets and the like. The water based ink comprises a colorant consisting of spherical fine grains colored by a color former, the spherical fine grains consisting of at least one member selected from polyolefins and other polymers containing, as a constitutional unit, at least one monomer selected from the group consisting of acrylonitrile, styrene, acrylic acid, methacrylic acid, methyl acrylate and methyl methacrylate.

4 Claims, No Drawings

WATER BASED INK CAPABLE OF DECOLORIZING OR DISCOLORING AND A PROCESS FOR THE PRODUCTION OF THE SAME

BACKGROUND OF THE INVENTION

1. Fields of the Invention

This invention relates to a water based ink capable of decolorizing or discoloring written or printed letters or images through an organic solvent or heating, which is used for a writing instrument such as roller ball, marker, etc., printing ink, ink jet.

2. Description of the Prior Art

Lately, as an ink capable of decolorizing or discoloring, there have been developed and have practically been used an ink of aqueous dye type utilizing an oxidation and reduction reaction (JP-B-54-22344) and an ink of oily dye type using leuco dyes (JP-B-2-29102). Since the above described ink is an ink of dye type, however, written lines thereof are inferior in water proof property and light proof property and when writing on a paper, there occur blurring or bleeding through it. Furthermore, in the case of an ink of the type utilizing an oxidation and reduction reaction, such a problem arises that writing cannot again be carried out because a decolorizing solution containing a reducing agent is excessively coated during decolorizing and the reducing agent remains on a decolorized site. As a prior art technique, an ink capable of decolorizing by irradiation of infrared rays, has been known (JP-A-6-73319), but this ink meets with a problem that the ink or written lines tend to fade.

As a method for solving the above described problem, it can be considered to use a pigment for a colorant. In general, an ink using a pigment is excellent in water proof property as well as light proof property of written lines, so that the blurring or bleeding through is hard to occur, as well known in the art. As a method of pigmentizing using a leuco dye, there are proposals to make pigments by applying methods for preparing tonors to be used for printers or copiers (JP-A-10-88046, JP-A-10-287081). In order to decolorize written lines of the ink, based on JP-A-10-287081, the paper for writing is immersed in a special remover, followed by heating, and the decolorizing is thus rendered possible. This teaches that it is impossible to readily effect the decolorizing. The ink based on JP-A-10-88046 comprises a leuco dye, developer, decolorizer and resin, in which the leuco dye and developer are interacted and are in color-developed state. This decolorizer is a material having such a property as preferentially combining with the developer during melting the resin or dissolving the resin with a solvent, whereby the decolorizing is rendered possible with an organic solvent and/or by heating.

In addition, as an ink for a writing instrument to which the above described technique is applied, a water based ink composition for a roller ball has been proposed (Japanese Patent Application No. 249544/2000). The above described pigment has an advantage that repeated writing can be carried out on a decolorized site, since a leuco dye and decolorizer are coated with a resin and are not brought into direct contact with each other.

However, the above described colorant is generally prepared by mixing and kneading a color former, developer, decolorizer and resin to obtain a lump of product and then pulverizing in gaseous phase by means of a jet mill to give the colorant. The colorant prepared by the above described method has the following disadvantages that:

1) it is difficult to obtain a colorant with a particle or grain diameter of at most 3 $\mu$m in view of the structure of a pulverizer, during which an ink prepared therefrom meets with problems on the precipitation and adhesiveness property of the colorant, 2) the grain diameter is not uniform, so writing feel is bad, 3) the surface of the colorant is not smooth, so diffused reflection of light takes place to cause white turbidity seen as pale color, 4) since there is a color-developing component even in the inside of the colorant, not related with the color tone of the ink, the color-developing component is present in an amount than required, 5) because of the above described items 3) and 4), the ratio of the color-developing component is increased, resulting in increase of the cost and 6) since the decolorizer is also contained in the colorant, the resultant water based ink encounters a problem of fading of the ink color during passage of time.

The prior art ink of a dye type, capable of decolorizing or discoloring, is inferior in water proof property and light proof property and when writing on a paper, there occurs blurring or bleeding of the ink through the paper. Moreover, such a problem arises that writing cannot again be carried out where the decolorizing has been carried out. In the case of an ink of a pigment type, there is also a problem that fine granulation is difficult, writing feel is bad and color tone is too pale.

SUMMARY OF THE INVENTION

It is an object of the present invention to provide an ink having a uniform and fine grain diameter, deep color tone and no problem of fading, which is prepared by another method than that of pulverizing a pigment capable of decolorizing or discoloring in gaseous phase.

It is another object of the present invention to provide a process for the production of an ink having a uniform and fine grain diameter, comprising adding a coloring material such as leuco dyes, etc. and developer to a suspension of spherical fine grains consisting of at least one member selected from polyolefins and other polymers containing, as a constitutional unit, at least one monomer selected from the group consisting of acrylonitrile, styrene, acrylic acid, methacrylic acid, methyl acrylate and methyl methacrylate.

These objects can be achieved by a water based ink comprising a colorant consisting of spherical fine grains colored by a color former, the said spherical fine grains consisting of at least one member selected from polyolefins and other polymers containing, as a constitutional unit, at least one monomer selected from the group consisting of acrylonitrile, styrene, acrylic acid, methacrylic acid, methyl acrylate and methyl methacrylate.

DETAILED DESCRIPTION OF THE INVENTION

The inventors have found that when an ink is prepared by coloring spherical fine grains obtained by a polymerization reaction with a color former such as leuco dyes, not by pulverizing a lump of product, for example, using a jet mill for the preparation of a pigment used in the ink, decolorizing or discoloring can be effected by an organic solvent and/or heating, and have reached the present invention. Since the spherical fine grains herein obtained by emulsion polymerization and/or suspension polymerization can be formed into substantially true spheres while making uniform the grain diameter with a high precision upto a mean grain diameter of about 0.05 to 1 μm, it is posssible to solve the problems as an ink for a writing instrument that the grain diameter is large or the grain diameter is not uniform. Moreover, the dye adheres to the surface of the grain, so that the color tone of the colorant is deep, the quantity of the dye to be used is saved and the colorant can be prepared with a lower cost.

The prior art ink to be decolorized has been rendered capable of decolorizing by tracing a decolorizing liquid containing a decolorizer after writing or previously incorporating a decolorizer in an ink. In the present invention, on the other hand, decolorizing or discoloring is made possible by using an organic solvent and/or heating without separately tracing a decolorizer liquid containing a decolorizer or adding a decolorizer to an ink, based on finding that general papers have a decolorizing effect for the present ink. However, when writing or printing is carried out on an acidic paper having a developing action or a glass or plastic having no decolorizing action, are sometimes not sufficiently decolorized or discolored only by an organic solvent and/or heating. In such a case, decolorizing or discoloring is made possible by incorporating a basic compound such as aqueous ammonia or triethanolamine in an organic solvent. As in the prior art, decolorizing or discoloring can be carried out by an organic solvent and/or heating by adding to an ink a decolorizer which does not react with colored spherical fine grains, nor fades the ink color. For example, Lewis basic materials such as polyvinylpyrrolidone, urea, ethyleneurea, hydantoin and the like can be used.

That is, the present invention and embodiments thereof can be summarized below:

(1) A water based ink comprising a colorant consisting of spherical fine grains colored by a color former, the said spherical fine grains consisting of at least one member selected from resins.

(2) The water based ink as described in the foregoing (1), wherein the colorant consists of spherical fine grains colored by a color former, the said spherical fine grains consisting of at least one member selected from polyolefins and other polymers containing, as a constitutional unit, at least one monomer selected from the group consisting of acrylonitrile, styrene, acrylic acid, methacrylic acid, methyl acrylate and methyl methacrylate.

(3) The water based ink as described in the foregoing (1) or (2), wherein the colorant is contained in a proportion of 5 to 40 weight %.

(4) The water based ink as described in any one of the foregoing (1) to (3), wherein the color former is a leuco dye.

(5) The water based ink as described in any one of the foregoing (1) to (4), wherein the spherical fine grains are colored with a leuco dye to obtain a colored ink.

(6) The water based ink as described in any one of the foregoing (1) to (5), wherein decolorizing or discoloring is carried out by at least one of using an organic solvent and heating.

(7) The water based ink as described in any one of the foregoing (1) to (6), wherein the developer for color-developing a leuco dye is at least one compound selected from the group consisting of phenolic hydroxyl group-containing compounds and phosphate group-containing compounds.

(8) The water based ink as described in any one of the foregoing (1) to (7), wherein the ink is acidic.

(9) The water based ink for a writing instrument, wherein the spherical fine grains used in the ink described in any one of the foregoing (1) to (8) have a mean grain diameter of at most 1 μm.

(10) A process for the production of a water-based ink, comprising adding at least one member selected from the group consisting of organic solvents and surfactants to a color former and developer to color-develop a dye solution and dropwise adding the thus color-developed dye solution to a suspension of spherical fine grains consisting of at least one member selected from polyolefins and other polymers containing, as a constitutional unit, at least one monomer selected from the group consisting of acrylonitrile, styrene, acrylic acid, methacrylic acid, methyl acrylate and methyl methacrylate, thereby coloring the spherical fine grains.

PREFERRED EMBODIMENTS OF THE INVENTION

In the present invention, an ink capable of decolorizing and discoloring by using an organic solvent and/or heating is obtained by coloring spherical fine grains consisting of at least one member selected from resins, in particular, polyolefins and other polymers containing, as a constitutional unit, at least one monomer selected from the group consisting of acrylonitrile, styrene, acrylic acid, methacrylic acid, methyl acrylate and methyl methacrylate with a color former, in particular, a leuco dye color-developed by the use of a developer, thus resulting in a water based ink.

The color former used in the present invention typically includes leuco dyes, for example, compounds having lactone ring in the molecule, such as triphenylmethane type, diphenylmethane type, spiropyran type, fluoran type, rhodamine lactam type, etc. One or more of these compounds can be used in admixture.

Examples of these compounds are "CVL", "Green DCF", "Vermilion DCF", "Red DCF", "Orange DCF", "TH-106", "TH-107", "TH-108", "TH-109", "CF-51"and "D. L. M. B.", all of which are commercial names of Hodogaya Chemical Co., Ltd., "DEBN", "RED 500", "RED 520", "S-205", "Black 100", "Black 202", "Black 305", "ETAC", "Blue 220", "NIR Black 78", "Green 300" and "PINK 535", all of which are commercial names of Yamada Chemical Co., Ltd. and "ODB", "ODB-2", "ODB-7", "Black-15", "Black-173", "Blue-63", "Blue-502", "Green-40", "Red-3", "Red-40", "MNSP", "LCV", "GN-2", "GN-169" and "GN-118", all of which are commercial names of Yamamoto Chemical, Inc.

As the developer capable of coloring the color former through formation of a pair thereof, there are used compounds having phenolic hydroxyl group in the molecule, such as hydroxyacetophenone type, hydroxybenzophenone, gallic acid estyer type, benzenetriol type, bisphenol type, triphenol type, cresol type compounds, etc., or compounds having phosphate group in the molecule, such as phosphoric acid, phosphoric acid monoesters, phosphoric acid diesters, etc., individually or in combination.

Examples of these compounds are, as the compounds having phenolic hydroxyl group, dihydroxyacetophenone, trihydroxyacetophenone, dihydroxybenzophenone, trihydroxybenzophenone, tetrahydroxybenzophenone, dihydrobenzoic acid, bisphenol, hydroxyphenylalkylbenzotriazole, methylenetris-p-cresol, gallic acid alkylesters, etc., and as the compounds having phosphate group, monoalkylphosphoric acid esters, dialkylphosphoric acid esters, polyoxyethylene monoalkylphosphoric acid esters, polyoxyethylene dialkylphosphoric acid esters, etc., the alkyl group being selected from methyl, ethyl, propyl, butyl, nonyl, lauryl, oleyl and stearyl groups. Commercial names of the compounds having phosphate group are Phosphanol Series (Toho Chemical Industry Co., Ltd.), Plysurf Series (Dai-ichi Kogyo Seiyaku Co., Ltd.), Newkol 565-PS (Nippon Nyukazai Co., Ltd.), etc.

In the present invention, there can be used a leuco dye in a proportion of 0.1 to 2 weight % and a developer in a proportion of 0.1 to 3 weight % to the weight of the ink. The proportion by the developer to the leuco dye, depending on the valence of the developer, is generally at least 1 chemical equivalent, preferably 1 to 3 chemical equivalent. Furthermore, the colored spherical fine grains can be used in a proportion of 5 to 40 weight %, preferably 10 to 25 weight % to the weight of the ink. The proportion of the solvent used in the above described ink is 5 to 30 weight % in the case of using the colored spherical fine grains as a suspension for the preparation of an ink, and 0 to 10 weight % in the case of meaning an organic solvent (and/or surfactant) used for coloring the spherical fine grains.

As an acid for acidifying the ink, there can be used inorganic acids such as hydrochloric acid, nitric acid, sulfuric acid, phosphoric acid, thiosulfuric acid, chloric acid, chlorous acid, perchloric acid, etc., or organic acids such as formic acid, acetic acid, propionic acid, citric acid, malic acid, oxalic acid, phenol, cresol, acrylic acid, methacrylic acid, etc. From the standpoint of safety for the human body, it is preferable to choose acetic acid, hydrochloric acid, citric acid, malic acid and the like. Since the developer, namely, the compounds having phenolic hydroxyl group or compounds having phosphate group functions also as an acidifying material, moreover, the ink can be acidified without using the above described acidifying material depending on the property or use object of the ink.

The spherical fine grains consist of at least one of polyolefins and other polymers containing, as a constitutional unit, at least one monomer selected from the group consisting of acrylonitrile, styrene, acrylic acid, methacrylic acid, methyl acrylate and methyl methacrylate, in the form of homopolymers or copolymers. Above all, acrylonitrile-styrene-methacrylic acid copolymers, methyl methacrylate polymer or polyethylene are preferably used. For the polymerization, any one of emulsion polymerization, suspension polymerization and vapor phase polymerization can be applied. During the same time, the mean grain diameter of the spherical fine grains is not particularly limited in the case of a printing ink, but can be allowed upto 0.05 to 1 $\mu$m, more preferably 0.05 to 0.5 $\mu$m, in the case of an ink for a writing instrument. When the average grain diameter of the spherical fine grains is smaller than 0.05 $\mu$m, it is not considered that problems arise on practical use, but in fact, preparation thereof is very difficult. When it exceeds 1 $\mu$m, such a problem takes place that the ink is hard to pass through a nib and settling of the colorant occurs in the ink, thus resulting in difficulty of writing.

In addition, as a fixing resin for allowing the colorant to adhere to a paper surface, a water-soluble resin or aqueous resin emulsion can be used. As the water-soluble resin, there can be used water-soluble nylon resin, water-soluble polyvinylacetal resin, water-soluble acrylic resin, water-soluble polyamide resin, polyethylene oxide, polyvinyl alcohol, polyvinylpyrrolidone, esterified starch, dextrin, reducing malt sugar, sugar alcohol, carboxymethyl cellulose, etc. Polyvinyl alcohol, polyvinylpyrrolidone and dextrin are preferably used. As the aqueous resin emulsion, there can be used ethylene-vinyl acetate emulsion, ethylene-vinyl acetate-vinyl chloride emulsion, ethylene-vinyl acetate acrylic emulsion, acrylic emulsion, styrene acrylic emulsion, styrene acrylonitrile emulsion, acrylonitrile butadiene emulsion, acrylic butadiene emulsion, urethane emulsion, polyester emulsion, etc. Ethylene-vinyl acetate emulsion and ethylene-vinyl acetate-vinyl chloride emulsion are preferably used. These materials can be used individually or in combination.

When, for the purpose of discoloring, ordinary known dyes and/or pigments are simultaneously used in addition to the colorant capable of decolorizing, only the color of the color former is decolorized to retain the color of only the ordinary known dyes and/or pigments, thus rendering possible the discoloring. As the dye, there can be used acid dyes, basic dyes and direct dyes. As the pigment, there can be used organic pigments such as those of azo type, phthalocyanine type, quinacridone type, anthraquinone type, dioxazine type, etc., inorganic pigments such as those of carbon black, synthetic mica, titanium dioxide, metallic fine powder, etc. and known resin pigments, obtained by coloring spherical fine grains obtained by emulsion polymerization with ordinary dyes, individually or in combination. Preparation of the ink capable of being discolored is generally carried out by coloring spherical fine grains obtained by emulsion polymerization through joint use of a color former and ordinary dye, whereby only the color of the color former is decolorized to retain the color of only the ordinary known dyes, thus rendering possible the discoloring.

As the organic solvent for a solvent for decolorizing, there are used ketone type solvents such as acetone, methyl ethyl ketone, methyl propyl ketone, diethyl ketone, ethyl propyl ketone, dipropyl ketone, acetyl acetone, acetophenone, 3-methyl-2-batanone, 3,3-dimethyl-2-butanone, 2,4-dimethyl-3-pentanone, 2,6-dimethyl-4-heptanone, etc., ether type solvents such as dimethyl ether, diethyl ether, methyl ethyl ether, dipropyl ether, dibutyl ether, 1,2-dimethoxyethane, 1,2-diethoxyethane, pyrane, furan, methylfuran, tetrahydrofuran, ethylene oxide, propylene oxide, dioxane, etc., ester type solvents such as ethyl acetate, butyl acetate, isoamyl acetate, methyl acrylate, ethyl acrylate, methyl methacrylate, ethyl methacrylate, etc., alcohol type solvents such as methanol, ethanol, propanol, butanol, pentanol, hexanol, benzyl alcohol, ethylene glycol, propylene glycol, etc., glycol ether type solvents such as 2-methoxyethanol, 2-ethoxyethanol, 1-methoxy-2-propanol, etc., glycol ether ester type solvents such as methylglycol acetate, ethylglycol acetate, etc., hydrocarbon type solvents such as hexane, heptane, cyclohexane, methylcyclohexane, etc., aromatic hydrocarbon solvents such as benzene, toluene, xylene, etc., halogenated hydrocarbon type solvents such as methyl chloride, methylene chloride, chloroform, dichloroethane, trichloroethane, tetrachloroethane, perchloroethane, perchloroethyelene, chlorobenzene, etc., hetero atom-containing hydrocarbon type solvents such as aniline, toluidine, pyridine, bipyridine, dimethylimidazolidinone, dimethyl sulfoxide, etc., individually or in combination. From the standpoint of safety for the human body and drying property, etc. of the solvents, in particular, acetone, 1,2-dimethoxyethane and 1,2-diethoxyethane are preferable. The hetero atom herein referred means, in particular, nitrogen atom and sulfur atom, not including oxygen atom.

A solvent composition for decolorizing, comprising a decolorizing assistant for promoting decolorizing in addition to a solvent for decolorizing, can be used as a solvent for decolorizing. As the decolorizing assistant, there can be used basic compounds, for example, inorganic basic compounds such as alkali metal hydroxides or alkaline earth metal hydroxides each having basic hydroxyl group, alkali metal carbonates or alkaline earth metal carbonates, alkali metal alkoxides and the like, and Lewis basic compounds such as ammonia, urea and urea derivatives, primary amines, secondary amines, tertiary amines, primary amides, secondary amides and tertiary amides, individually or in combination. When decolorizing is carried out using a solvent composition for decolorizing, containing the above described basic compound, a written line or image can be decolorized. When the basic compound used herein has no volatility, however, the basic compound remains on a site where the solvent composition for decolorizing has been used and rewriting or reprinting cannot be effected on this site since the ink instantaneously is reacted with the basic compound and decolorized. When the basic compound has a volatility, on the other hand, the basic compound vaporizes from a site where the solvent composition for decolorizing has been used and rewriting or reprinting can be carried out thereon. As a volatile basic compound for the solvent composition for decolorizing, there can be used, individually or in combination, amines such as monoethylamine, diethylamine, triethylamine, dipropylamine, butylamine, allylamine, ethylenediamine, monoethanolamine, diethanolamine, triethanolamine, propanolamine, aniline, pyridine, bipyridine, 3,5-dimethylimidazolidinone, etc. and amides such as formamide, dimethylformadmide, etc. Triethanolamine is more preferably used from the standpoint of decolorizing capacity, safety for the human body, drying property of the solvent.

If necessary, the commonly used additives, for example, surfactants, preservatives, rust preventives, water miscible humectants, lubricants, dispersing resins, etc. can be added to the ink within the scope of the present invention, which should not, of course, hinder the decolorizing and/or discoloring through reaction with the coloring materials, developers and spherical fine grains.

EXAMPLE

The following examples are given in order to illustrate the invention in more detail without limiting the same.

Example 1

An apparatus comprising a four neck flask of 2 litters, condenser, thermometer, 500 ml separating funnel for charging monomers and stirring means was set in a thermostat vessel and 300 g of ion exchanged water was charged in the flask, followed by heating to 80° C.

A monomer mixture of 140 g of acrylonitrile, 228 g of styrene and 32 g of methacrylic acid was added to a mixed solution of 218 g of ion exchanged water and 80 g of sodium polyoxyethylene alkyl ether sulfate, mixed and stirred, in which 2 g of ammonium persulfate was then dissolved, and the resulting mixture was dropwise added from the above described separating funnel to the flask for 3 hours and polymerization was finished after further 5 hours.

20 g of ion exchanged water and 16 g of glycerine were then added with stirring to 50 g of the resulting suspension of the emulsified polymer to prepare a suspension. On the other hand, a dye solution was prepared by adding 2 g of acetone to 0.6 g of CVL (blue type leuco dye, manufactured by Hodogaya Chemical Co., Ltd., commercial name) and 1.2 g of propyl gallate (developer, manufactured by Wako Pure Chemical Industries, Ltd.) with heating and color-developing to evaporate the acetone, and further adding 2 g of PELEX NBL (surfactant, sodium alkylnaphthalenesulfonate, manufactured by Kao Corporation) with heating and stirring. The thus prepared dye solution was dropwise added to the foregoing suspension and the resulting suspension was heated at 50° C. and dyed for 1 hour to obtain a blue ink with a mean grain diameter of 0.12 $\mu$m and a pH of 2.5. This ink was charged in a polyethylene reservoir in an analogous manner to a commercially available reservoir type marker (OPTEX or ZEBRITE, manufactured by Zebra Co., Ltd., commercial name), loaded in a reservoir and fitted with a polyethylene nib and cap, thus preparing a blue marker. Using the thus prepared marker, writing was carried out by hand on a PPC paper (manufactured by Oji Paper Co., Ltd., commercial name).

Example 2

30 g of ion exchanged water and 15 g of glycerine were added to 50 g of an emulsified polymer suspension obtained in Example 1 to form a solution. On the other hand, 3.0 g of ethylene glycol and 2.0 g of PELEX NBL were added to 0.4 g of RED 40 (red type leuco dye, manufactured by Yamamoto Chemical, Inc., commercial name) and 2.0 g of Phosphanol RM 710 (developer, mixture of phosphoric acid monoalkyl ester and phosphoric acid dialkyl ester, manufactured by Toho Chemical Industry Co., Ltd., commercial name), heated, stirred and color-developed to form a dye solution which was then dropwise added to the foregoing solution. The resulting suspension was then heated and dyed at 50° C. for 1 hour to obtain a red ink with a mean grain diameter of 0.12 $\mu$m. To 30 g of the resulting ink was added 0.1 g of Kayarus Turquoise Blue GL (blue dye, manufactured by Nippon Kayaku Co., Ltd., commercial name) to obtain a violet ink having a pH of 3.1. The resulting ink was charged in an ink tank in an analogous manner to a commercially available liquid ink system marker (SPARKY 1 or ZAZZLE BRIGHTS, manufactured by Zebra Co., Ltd., commercial name), loaded by a bulb-charged end cover and fitted with a polyester nib and cap, thus preparing a violet marker. Using the thus prepared marker, writing was carried out by hand on a PPC paper (manufactured by Oji Paper Co., Ltd., commercial name).

Example 3

100 g of ion exchanged water, 3 g of PELEX NBL and 20 g of MP-1451 (methyl methacrylate emulsified polymer, manufactured by Soken Chemical & Engineering Co., Ltd., commercial name) were added to a vessel containing 75 g of glass beads (2 mm), covered and shaken for 5 minutes by means of a shaker to disperse spherical fine grains. To 50 g of the resulting dispersed suspension was dropwise added with stirring a solution obtained by adding 0.3 g of PINK 535 (pink type leuco dye, manufactured by Yamada Chemical Co., Ltd., commercial name) and 1 g of di-n-butyl phosphate (developer, manufactured by Tokyo Kasei Kogyo Co., Ltd.) to 2 g of ethyl alcohol and 2 g of ethylene glycol, dissolving, heating and color-developing, and then heated and dyed at 50° C. for 1 hour to obtain a pink ink with a mean grain diameter of 0.15 $\mu$m and a pH of 4.4. The resulting ink was charged in an ink tank as an ink for an ink jet printer using a piezo element (PM-700J, manufactured by Seiko Epson Corporation, commercial name) to prepare an ink cartridge for an ink jet printer. Using the thus prepared ink cartridge, printing was carried out on an ink-jet print paper (manufactured by Victor Company of Japan, Ltd., commercial name).

Example 4

20 g of the ink obtained in Example 3 and 10 g of LUMIKOL NKW-3005 (aqueous dispersion of fluorescent resin pigment, manufactured by Nippon Keiko Kagaku Co., Ltd., commercial name) were mixed with stirring to obtain an orange ink. The resulting ink showed a pH of 5.8. The resulting ink was charged in an ink tank as an ink for an ink jet printer using a piezo element (PM-700J, manufactured by Seiko Epson Corporation, commercial name) to prepare an ink cartridge for an ink jet printer. Using the thus prepared ink cartridge, printing was carried out on an ink-jet print paper (manufactured by Victor Company of Japan, Ltd, commercial name).

Example 5

50 g of ion exchanged water, 2 g of PELEX NBL and 10 g of MP-300F (methyl methacrylate emulsified polymer, manufactured by Soken Chemical & Engineering Co., Ltd., commercial name) were added to a vessel containing 50 g of glass beads (2 mm), covered and shaken for 5 minutes by means of a shaker to disperse spherical, fine grains. To the resulting dispersed suspension was dropwise added with stirring a solution obtained by adding 0.3 g of RED DCF and 2 g of Newcol-565-PS (developer, polyoxyethylenenonylphenylether phosphoric acid ester, manufactured by Nippon Nyukazai Co., Ltd., commercial name) to 2 g of ethylene glycol and 1.5 g of PELEX NBL, dissolving, heating and color-developing, and then heated and dyed at 50° C. for 1 hour to obtain a red ink with a mean grain diameter of 0.35 $\mu$m. To 30 g of the resulting ink was added 0.15 g of xanthane gum with stirring to obtain an ink for a gel ink roller ball having a pH of 4.6. The resulting ink for a gel ink roller ball was charged in a polypropylene tube in an analogous manner to a commercially available gel ink roller ball (BW-100, manufactured by Zebra Co., Ltd., commercial name, stainless tip ball diameter 0.7 mm). Then the tube was fitted with a pen point, charged with a suitable quantity of an ink follower from the end thereof and subjected to defoaming at 200 G by a separater to prepare a roller ball. Using the the thus prepared roller ball, writing was carried out by hand on a PPC paper (manufactured by Oji Paper Co., Ltd, commercial name).

Example 6

50 g of Chemipearl W-700 (polyolefin vapor phase polymer dispersion, manufactured by Mitsui Sekiyu Kagaku Kogyo Co., Ltd., commercial name), 20 g of ion exchanged water, 10 g of ethylenen glycol and 10 g of glycerine were added to a beaker and stirred to obtain a dispersion. To the resulting dispersion was dropwise added with stirring a solution obtained by adding 0.3 g of PINK 535, 1 g of di-n-butyl phosphate and 0.1 g of Fast Green FCF (green type dye, manufactured by Daiwa Dyestuff Mfg. Co., Ltd., commercial name) to 2 g of ethyl alcohol and 2 g of ethylene glycol, dissolving, heating and color-developing, and then heated and dyed at 65° C. for 1 hour to obtain a black ink with a mean grain diameter of 1 $\mu$m. To 30 g of the resulting ink was added 0.6 g of PVA-124 (polyvinyl alcohol, manufactured by Kuraray Co., Ltd., commercial name), mixed and stirred to prepare an ink for printing, having a pH of 5.8. Using the thus prepared ink, printing was carried out on a PPC paper (manufactured by Oji Paper Co., Ltd., commercial name) by means of an ordinary relief printing machine.

Comparative Example 1

Ion exchanged water was used in place of the emulsified polymer of Example 1 to prepare an aqueous solution of a blue dye. The resulting ink had a pH of 4.0. The resulting ink was charged in an ink tank in an analogous manner to a commercially available liquid ink system marker (SPARKY 1 or ZAZZLE BRIGHTS, manufactured by Zebra Co., Ltd., commercial name), loaded by a bulb-charged end cover and fitted with a polyester nib and cap, thus preparing a blue marker. Using the thus prepared marker, writing was carried out by hand on a PPC paper (manufactured by Oji Paper Co., Ltd., commercial name).

Comparative Example 2

0.1 g of Rhodamine B was used in place of CVL of Example 1 to prepare a pink ink. The resulting ink had a pH of 3.0. The resulting ink was charged in an ink tank in an analogous manner to a commercially available liquid ink system marker (SPARKY 1 or ZAZZLE BRIGHTS, manufactured by Zebra Co., Ltd., commercial name), loaded by a bulb-charged end cover and fitted with a polyester nib and cap, thus preparing a pink marker. Using the thus prepared marker, writing was carried out by hand on a PPC paper (manufactured by Oji Paper Co., Ltd., commercial name).

Comparative Example 3

The violet ink obtained in Example 2 was treated with aqueous ammonia to adjust pH to 8.5 and obtain a blue ink. The resulting ink was charged in an ink tank in an analogous manner to a commercially available liquid ink system marker (SPARKY 1 or ZAZZLE BRIGHTS, manufactured by Zebra Co., Ltd., commercial name), loaded by a bulb-charged end cover and fitted with a polyester nib and cap, thus preparing a blue marker. Using the thus prepared marker, writing was carried out by hand on a PPC paper (manufactured by Oji Paper Co., Ltd., commercial name).

Comparative Example 4

100 g of ion exchanged water, 2 g of SANMORIN OT-70 (sodium dioctylsulfosuccinate, surfactant, manufactured by Sanyo Kasei Kogyo Co., Ltd., commercial name) and 25 g of MX-300 (methyl methacrylate emulsified polymer, manufactured by Soken Chemical & Engineering Co., Ltd., commercial name) were added to a vessel containing 60 g of glass beads (2 mm), covered and shaken for 5 minutes by means of a shaker to disperse spherical fine grains. To 50 g of the resulting dispersed suspension was dropwise added with stirring a solution obtained by adding 0.3 g of PINK 535 and 0.6 g of propyl gallate to 2 g of ethyl alcohol, dissolving, heating and color-developing, and then heated and dyed at 50° C. for 1 hour to obtain a pink ink with a mean grain diameter of 3 $\mu$m and a pH of 6.3. The resulting ink was charged in an ink tank in an analogous manner to a commercially available liquid ink system marker (SPARKY 1 or ZAZZLE BRIGHTS, manufactured by Zebra Co., Ltd., commercial name), loaded by a bulb-charged end cover and fitted with a polyester nib and cap, thus preparing a pink marker. Using the thus prepared marker, writing was carried out by hand on a PPC paper (manufactured by Oji Paper Co., Ltd., commercial name).

Test Method

Test papers obtained by writing or printing in the foregoing Examples 1 to 6 and Comparative Examples 1 to 4 were used as test samples and subjected to the following test:

Estimation of Ink Color

The color of the resulting ink was visually confirmed.

Estimation of Color of Written or Printed Line on Test Paper

The color of the written or printed line on a test paper in each of Examples and Comparative Examples was visually confirmed.

Estimation of Decolorizing or Discoloring by Solvent for Decolorizing

Several drops of acetone as a solvent for decolorizing were dropwise added to the written or printed line on a test paper in each of Examples and Comparative Examples and after drying, the color of the written or printed line was visually confirmed.

Estimation of Decolorizing or Discoloring by Heating for Decolorizing

An iron heated at about 200° C. was pressed against the written or printed line in each of Examples and Comparative Examples and after cooling, the color of the written or printed line was visually confirmed.

Test Results

Test results are shown in Table 1.

TABLE 1

| Example No. | Estimation of Color of Ink | Estimation of Color of Written or Printed Line on Test Paper | Estimation of Decolorizing or Discoloring by Organic Solvent | Estimation of Decolorizing or Discoloring by Heating |
|---|---|---|---|---|
| 1 | blue | blue | colorless | colorless |
| 2 | violet | violet | blue | blue |
| 3 | pink | pink | colorless | colorless |
| 4 | orange | orange | yellow | yellow |
| 5 | red | red | colorless | colorless |
| 6 | black | black | green | green |
| Comparative Example | | | | |
| 1 | blue | colorless | — | — |
| 2 | pink | pink | pink | pink |
| 3 | blue | blue | blue | blue |
| 4 | pink | — | — | — |

(note) "-"No test was carried out.

In the case of Comparative Example 1, in which the spherical fine grains were not dyed, when writing on the paper, the color former reacted with the paper having a decolorizing function and the written line was not obtained. In Comparative Example 2, in which dyeing was carried out by the ordinary dye, decolorizing or discoloring was impossible. In Comparative Example 3, in which the ink was basic, the coloring material functioned as a decolorizer in the ink and was in decolorized state, so the color of the ink was only blue corresponding to the ordinary dye, which taught that decolorizing could not be carried out. In Comparative Example 4, in which the spherical fine grains with a relatively larger grain diameter were used, the ink could not be passed through the wadded fiber point of the marker, i.e. writing was impossible.

In the case of Examples 1 to 6 according to the present invention, on the other hand, decolorizing or discoloring was favorably accomplished by using organic solvents and/or heating, whereby the effects of the present invention were clearly proved.

Advantages of the Invention

When the specified ink according to the present invention, in particular, comprising a colorant consisting of spherical fine grains colored by a coloring material, the said spherical fine grains consisting of at least one member selected from polyolefins and other polymers containing, as a constitutional unit, at least one monomer selected from the group consisting of acrylonitrile, styrene, acrylic acid, methacrylic acid, methyl acrylate and methyl methacrylate was used, decolorizing or discoloring of letters or images is capable through an organic solvent or heating.

What is claimed is:

1. A water based ink comprising a colorant consisting of spherical fine grains colored by a color former, the spherical fine grains consisting of at least one member selected from polyolefins and other polymers containing, as a constitutional unit, at least one monomer selected from the group consisting of acrylonitrile, styrene, acrylic acid, methacrylic acid, methyl acrylate and methyl methacrylate, the colorant being contained in a proportion of 5 to 40 weight %, the color former being a leuco dye color-developed by the use of a developer, the spherical fine grains being obtained by emulsion polymerization and/or suspension polymerization and colored with a leuco dye and a developer for color-developing the leuco dye to obtain a colored ink, said ink being decolorizable or discolorable by at least one of an organic solvent and heat and wherein the ink is acidic.

2. The water based ink as claimed in claim 1, wherein the developer for color-developing the leuco dye is at least one compound selected from the group consisting of phenolic hydroxyl group-containing compounds and phosphate group-containing compounds.

3. The water based ink for writing instrument, wherein the spherical fine grains used in the ink as claimed in claim 1 have a mean grain diameter of at most 1 μm.

4. A process for the production of a water-based ink, comprising adding at least one member selected from the group consisting of organic solvents and surfactants to a color former and developer to color-develop a dye solution and dropwise adding the thus color-developed dye solution to an emulsion or suspension of spherical fine grains consisting of at least one member selected from polyolefins and other polymers containing, as a constitutional unit, at least one monomer selected from the group consisting of acrylonitrile, styrene, acrylic acid, methacrylic acid, methyl acrylate and methyl methacrylate, thereby coloring the spherical fine grains to obtain said ink.

* * * * *